United States Patent [19]

Wiant et al.

[11] Patent Number: 5,009,917
[45] Date of Patent: Apr. 23, 1991

[54] METHOD FOR PRODUCING DEEP RED AND BLACK COCOA

[75] Inventors: Matthew J. Wiant, Dover; William R. Lynch, Milford, both of Del.; Robert C. LeFreniere, Bethel, Conn.

[73] Assignee: Kraft General Foods, Inc., Glenview, Ill.

[21] Appl. No.: 452,188

[22] Filed: Dec. 18, 1989

[51] Int. Cl.$^5$ .................. A23L 1/272; A23L 2/38
[52] U.S. Cl. ................... 426/631; 426/262; 426/593
[58] Field of Search ............... 426/631, 593, 267, 262

[56] References Cited

U.S. PATENT DOCUMENTS

| | | | |
|---|---|---|---|
| 3,119,693 | 1/1964 | Colten | 426/593 |
| 3,754,928 | 8/1973 | Haney | 426/631 |
| 4,235,939 | 11/1980 | Kimberly | 426/631 |
| 4,335,153 | 6/1982 | Ribon | 426/631 |
| 4,349,579 | 9/1982 | Raboud | 426/631 |

FOREIGN PATENT DOCUMENTS

| | | | |
|---|---|---|---|
| 233486 | 3/1986 | Fed. Rep. of Germany | 426/631 |
| 3716227 | 12/1988 | Fed. Rep. of Germany | 426/593 |

*Primary Examiner*—Carolyn Paden
*Attorney, Agent, or Firm*—Thomas R. Savoie

[57] ABSTRACT

A deep red or black dutched cocoa is produced by alkalizing cocoa presscake at between 150° to 300° F., 10 to 200 p.s.i. and 5 to 180 minutes. During the alkalization reaction, the reaction vessel is partially vented and an oxygen-containing gas is fed to the reaction vessel to maintain pressure and effect headspace changes at the rate of at least 3 per hour.

22 Claims, No Drawings

METHOD FOR PRODUCING DEEP RED AND BLACK COCOA

BACKGROUND FOR THE INVENTION

The present invention relates to a process for preparing cocoa products having improved color. More specifically, the present invention relates to a process for preparing dutched or alkalized cocoa, having a deeper or more intense red or black color than has heretofor been available, for use in coloring and/or flavoring foodstuffs. Cocoa powders having intense colors are desirable, since foodstuffs prepared with these acquire an especially attractive, rich chocolate color. A great coloring capacity also makes these cocoa powders especially economical to use. As examples of applications of intensely alkalized cocoa powders the following can be mentioned: bakery products, desserts, ice cream, cocoa beverages, toppings for ice cream, biscuits, and confectionery and compound coatings. These intensely alkalized cocoa powders are usually used in products which need further preparation to obtain a consumable product, such as cake mixes, ice cream mixes, dessert powders and so-called instant cocoa mixes. These alkalized cocoa powders are utilized because of the attractive color and flavor they impart to the finished product.

The importance of the use of cocoa powders with great coloring capacity is highlighted by the general tendency to restrict the use of artificial colors, the use of which in the above foodstuffs is actually prohibited in many countries. It is, of course, also possible to mix cocoa powders with great coloring capacity and slightly alkalized or even non-alkalized cocoa powders, in order to obtain a mixture in which the advantages of both types of cocoas are combined.

Dutching, or the reacting of sodium, potassium, ammonium and magnesium compounds with cacao material such as cacao nibs, cocoa liquor or cocoa powder has been employed for many years to give cocoa powder a darker, richer color. A strong demand for extremely dark cocoa exists in the cookie trade since it is desirable for chocolate, sandwich-type cookies to have the darkest possible color.

In prior-art dutching processes, various cocoa materials, such as beans, nibs (fine or coarse), liquor or partly defatted liquor, or granulated or powdered cocoa press cake have been used Large or small quantities of water have been used with the full amount or only a portion of the permitted alkaline substances. The cocoa material may be partially or completely roasted, and of any type. Nibs and dry alkali have been mixed and treated with water or have been ground dry to a paste, which then may or may not be water-treated. The alkali has been added all at once or in stages. The processing has been in open, jacketed mixers, so that the moisture removal begins almost as soon as the water is added, or in closed mixers or kettles where the water may be retained until certain results are obtained. In addition to these variations, there have been both batch and continuous processes.

Classical prior art processes involve the treatment of cleaned, roasted cacao nibs with an alkali, such as potassium carbonate, at a temperature of about 170° to 190° F. After a period of time ranging from about 2 to 48 hours, the nibs are removed and dried then they are ready for grinding to produce alkali-processed chocolate liquor which is then pressed to obtain cocoa solids and cocoa butter. Compared with natural cocoa made from the same cleaned, roasted nibs without alkali processing, the alkalized product is much darker, milder in acid character, and has a pH in water solution of about 7.5; whereas, the natural cocoa will have a pH of about 5.4. The alkalized cocoa will have a reddish-brown color; the untreated cocoa will be light brown.

More recently, processes which focus on the dutching of cocoa powder have been described U.S. Pat. No. 4,435,436 to Terink et al. describes the production of cocoa powder, having a desirable dark color and a relatively low pH, by treating cocoa powder with potassium hydroxide at between 65° and 90° C., at atmospheric pressure, for from 4 to 24 hours. U.S. Pat. Nos. 3,868,469 and 3,997,680 to Chalin disclose a powder cocoa dutching process wherein cocoa powder is reacted with an aqueous alkaline solution in an extruder at a temperature of 150° to 230° F. and a mechanical pressure of 500 to 1,300 p.s.i. for 2.5 to 5 minutes.

Another recent cocoa alkalization process has been described in U.S. Pat. No. 4,784,866 to Wissgott wherein meal (i.e., crushed and degermed raw nibs) or liquor is alkalized without the evaporation of water under air pressure of from 1 to 3 atmospheres. According to this patent, alkalization is carried out at a temperature of 60° to 100° C. for 30 minutes to 4 hours to produce colors ranging from red to dark brown.

SUMMARY OF THE INVENTION

This invention relates to a process for producing intensely or deep black or red colors using an alkali treatment with unique process conditions which maximize desirable color and flavor development, without producing an excessively high pH or noticeable off-flavors.

The process, according to this invention, involves the alkalization of particles of cocoa presscake (i.e., the cocoa material remaining after most of the cocoa fat has been removed from cocoa liquor by mechanical pressing). Typically, the cocoa particles will be subdivided to pass through a No. 4 U.S. Standard Sieve. These particles as combined with an aqueous alkaline carbonate, bicarbonate and/or hydroxide solution in a pressure reactor. The moisture content of the reaction mixture should be from 5 to 60% by weight and the level of carbonate, bicarbonate and/or hydroxide should be from 1 to 12, preferably 1 to 7 pounds per 100 pounds of cocoa. This cocoa will typically contain about 11% fat by weight. During the reaction, the contents of the reaction vessel are continuously mixed and a temperature of between 150° and 300° F. and a pressure between 10 and 200 psi is maintained. Pressure is effected by means of an oxygen-containing gas. Further, during the reaction period, the vessel is vented and the oxygen-containing gas is fed to the reaction vessel at a rate sufficient to maintain pressure and effect headspace changes within the reaction vessel at a rate of at least 3 per hour.

After the desired reaction time, usually 5 to 180 minutes, the pressure is reduced within the vessel and the colored, dutched cocoa is dried. Drying may take place either within or outside of the reaction vessel. The colored cocoa may be further subdivided before, but preferably after drying.

Proper selection of reaction conditions, as will be apparent from the detailed description below, can lead to the production of either deep-black or deep red cocoa powder.

DETAILED DESCRIPTION OF THE INVENTION

This invention is directed to a process which employs a combination of operating parameters which allow the cocoa alkalization reaction to reach its fullest potential, without adverse effect on cocoa flavor. Cocoa alkalization reactions conducted in accordance with this invention permit the attainment of intense red and black colors which have not previously been produced commercially. On the basis of extensive empirical research and the study of the involved reaction kinetics, it is believed that this invention identifies unique and optimum operating parameters for transforming the color precursors which are present in cocoa beans into large deep-colored molecules which can impart intense red and black colors to alkalized cocoa material.

The process of this invention is particularly suited for use with cocoa solids as the raw material. Either a crushed cocoa presscake or a cocoa powder is appropriate, the later being easier to completely penetrate with an alkali solution. The ultimate goal of any dutching process is to react the color and flavor precursors which are only present in the cocoa solids. Although the process of this invention could be applied to cocoa nibs or liquor, the presence of a high level of cocoa fat in the nibs (meal), and liquor, impede dutching and lead to mediocre colors and degraded cocoa butter.

The alkalizing agents which may be used in this invention include all of the alkali carbonate, bicarbonate or hydroxide compounds which have been known and used in the prior art. Thus, sodium or potassium carbonates, bicarbonates or hydroxides, calcium hydroxide, and/or ammonium bicarbonate or hydroxide would be useful. The preferred alkalizing agents for dutching cocoas in accordance with this invention will vary depending on the specific color desired. For red products, the potassium compounds are most desirable. For black products, a combination of potassium and ammonium compounds yield the most intense colors while preserving superior flavor Since dutching is an alkali-induced oxidation reaction, higher levels of alkali will lead to deeper colors and faster reactions. The preferred level of alkali used in this invention will be from 1 to 7% by weight based upon the weight of cocoa solids.

Moisture is a necessary component of the alkalization reaction. In order to transport the alkali to the color precursors, sufficient moisture is needed to fully wet the cocoa solids. Although some color development will take place at lower moistures (5-35%), higher moisture levels (35-50%) are needed to achieve full particle penetration, and maximum color development. Moisture levels above 50% will yield decreasingly deep colors, and the resultant drying efficiencies will be reduced. Moisture levels above 60% will typically not be utilized. Preferably, the moisture content of the reaction mixture is maintained at between about 35 and 45% throughout the reaction period. If needed, moisture can be added to the reaction mixture during the reaction period in order to maintain a relatively constant moisture level.

Aeration is a critical component for producing the deep-colored alkalized cocoas of this invention. Since alkalization is a type of oxidation reaction, ample supplies of oxygen are needed in order to maximize color development. Thus, an oxygen-containing gas, including mixtures of oxygen and nitrogen, needs to be essentially constantly fed to the reaction mixture throughout the reaction period. This is best achieved by using compressed air, and allowing an "air bleed" from the reaction vessel to allow reacted gases to escape and allow fresh compressed air to enter. The oxygen-containing gas should be passed through the reactor, and preferably through the reaction mixture, in order to effect headspace changes at the rate of at least about 3 per hour, preferably 15 to about 50 per hour.

Throughout the reaction period a gas pressure from about 10 to 200 p.s.i. should be maintained within the reactor. Development of deep red colors will typically employ pressures from 10 to 200 p.s.i., while development of deep black colors will utilize pressures of from 30 to 200 p.s.i. Typical operating pressures will be from 75 to 150 p.s.i. Increasing gas pressure to about 180 p.s.i. (12 atmospheres) will yield increasing deep color, however, higher pressures will lead to diminishing returns on color development.

Reaction time and temperature are critical in determining the finished cocoa color. Typically times from about 5 to 180 minutes and temperatures of 150° to 300° F. (65.6° to 148.9° C.) will be employed. In general, the higher the temperature, the darker the color and the faster the alkali will react with the color precursors. For red products a temperature range from 150° to 220° F. (65.6° to 104.4° C.) and a time of less than 60 mintues is desirable. Higher temperatures will tend to produce dark brown colors. Times in excess of 60 minutes will tend to produce cocoas having less red intensity or chroma.

To produce black products, the temperature should be from 230° to 300° F. (110° to 149° C.), preferably from 250° to 275° F. (121.1° to 135° C.), with times from 60 to 180 minutes, preferably about 60 to 120 minutes. Temperatures above 275° F. (135° C.) will produce very black cocoas but may adversely impact flavor. In general, extending the length of the reaction will tend to produce darker colors, with lower pH levels.

This invention is best described in terms of utilizing cocoa presscake. The cocoa presscake should be reduced in size to 4 mesh (U.S. Standard Sieve) or smaller, typically less than 7 mesh, prior to reacting. The presscake should be loaded into a reactor which has excellent mixing, pressure capabilities, temperature control, and spray nozzles. An alkali solution should be prepared in a separate heated mixer, and there should be sufficient alkali solution to ensure adequate reaction moisture. The amount of alkalizing agents used depends on the desired finished product color and pH, but should never exceed governmental regulations in the finished cocoa. Usually, alkali levels less than 2% of the presscake weight will not produce deep colors.

After the alkali has been prepared, it can be heated to approach the desired reaction temperature, not to exceed 140° F. in the case of the ammonium compounds. The cocoa presscake can also preferably be heated to approach the desired reaction temperature to reduce come-up time to the reaction temperature. The alkali solution should then be sprayed into the mixing presscake, and the resultant mixture should be heated to the desired reaction temperature. The shorter the intended reaction time the more useful it will be to preheat the reaction ingredients.

The oxygen-containing gas should be introduced into the reactor as the alkali and presscake are mixed, and a pressure of 10 to 200 p.s.i. should be maintained throughout the reaction. During this time, it is also important for a gas-flow to exist in the reactor which allows for at least 3 headspace changes per hour. Good mixing throughout the reaction is a critical element to ensure both aeration of the product and homogenity. The temperature should be controlled throughout the reaction at the desired temperature, plus or minus about 5° F. (2.8° C.).

At the end of the reaction period, the pressure should be released to the atmosphere, the temperature control can be removed, and the product can be discharged for drying, or dried in the same vessel. Vacuum drying would be a typical drying technique.

After drying, the dutched cocoa presscake should be cooled and ground into a fine cocoa powder by conventional means. The resultant cocoas are an excellent color and flavor-enhancer in chocolate-flavored products including beverages, desserts, baked goods, and frozen novelties. These cocoas do not possess any of the negative flavor attributes of dutched cocoas prepared by prior art dutching processes.

The process, according to this invention, will yield intensely deep red and black cocoa products. The coloring power is such that, even when blended with 50% natural (unprocessed) cocoa, the color is still deeper than the best conventionally-processed cocoas.

The color analysis of cocoa powders has never been standardized in the chocolate industry. The method utilized for color measurement in this disclosure involves suspending the cocoa at a 2.5% by weight level in an aqueous gelatin solution. The solution contains 5.0% gelatin and 0.06% of titanium dioxide which is used as a whitener in order to raise the L value of the suspension to a level where it is easier to differentiate similarly-colored samples. The suspension is placed in a petri dish and quickly cooled to 60° F. (15.6° C.) to form a solid gelatin disk. Each sample is measured four times through the bottom of the dish using a colorimeter with the well-known Hunter L, a, b scale.

The Hunter L, a, b scale was designed to give measurements of color units of approximate visual uniformity. Thus "L" measures lightness and varies for 0 for pure black to 100 for pure white. The "a" value measures redness when positive, greenness when negative and gray when zero. The "b" value measures yellowness when positive, blueness when negative and gray when zero. These color scales are described more fully in Hunter, R. S., *The Measurement of Appearance,* John Wiley and Sons, New York, 1975.

In the cocoa industry it is thought by some that a high value for the ratio a:b implies a very red color. The a:b ratio for most commercial, dutched-cocoa powders is about 1.25. Commercial deep red powders typically have an "L" value of 19 to 24. According to this invention deep red powder are obtained having an "L" value of less than 16 and an "a" to "b" ratio of more than 1.6, preferably more than 1.8. Deep black cocoas have not heretofore been available. By means of the present invention deep black cocoas which have an "L" value of less than 14, preferably less than 12, are obtained.

Our invention is further described, but not limited, by the following examples:

EXAMPLE 1

Fifty Pounds of crushed (minus 4 U.S. mesh) cocoa presscake was loaded into a pressurizable agitating batch reactor. The cocoa was heated to 120° F. and was slowly sprayed with a 150° F. alkalizing solution consisting of 41 pounds of water and 2.2 pounds of potassium carbonate. The reactor was then pressurized to 100 p.s.i.g. with compressed air. The mixture was reacted for 47 minutes at 205±5° F. During the reaction, the reactor was continuously and Partially vented to allow constant purging of air from the headspace. Fresh air was continously added to maintain pressure. Headspace in the reactor was changed at the rate of about 50 Per hour. After reacting, the reactor was fully vented to atmospheric pressure and the cocoa was dried using vacuum and heat. The resultant dark red cocoa was ground into a fine powder. This red powder possessed a well-rounded chocolate flavor and a good "Dutchy" flavor. The PH was about 8.0 (in a 5% solids aqueous solution) and when analyzed on a Macbeth 1500 Colorimeter in a lightened gelatin base the color values were L=14.63, a=7.31, b=3.64 and a:b=2.01.

EXAMPLE 2

Fifty pounds of crushed cocoa presscake was loaded into a pressurizable, agitating, batch reactor. The cocoa was heated to 105° F. and was slowly sprayed with a 105° F. alkalizing solution consisting of 41 pounds of water, 2.60 pounds of potassium carbonate and 0.73 pounds of ammonium bicarbonate. The reactor was then pressurized to 100 p.s.i.g. with compressed air. The mixture was reacted for 135 minutes at between 250° and 260° F. During the reaction, the reactor was continuously and partially vented to allow constant purging of air from the headspace. Fresh air was continuously added to maintain pressure and effect headspace changes at the rate of 35 per hour. After reacting, the reactor was fully vented to atmospheric pressure and the cocoa was dried using vacuum and heat. The resultant dark black cocoa was ground into a fine powder. This black powder possessed a strong dutched, chocolate flavor and was ideally-suited for use as a colorant or for blending with other cocoas to intensify color and flavor. The pH was about 6.4 and the color values were L=10.60, a=2.75, b=1.62 and a:b=1.7.

EXAMPLE 3

A controlled experiment was conducted to demonstrate the significance of effecting headspace changes during the reaction period. Fifty pounds of crushed cocoa presscake was heated to about 117° F. and loaded into a pressurizable, agitating, batch reactor. The heated cocoa was then sprayed with a heated (150°-160° F.) alkali solution consisting of 41 pounds of water and 1.9 pounds of potassium carbonate. The mixture was then pressurized to 90-100 psi and reacted for 42 minutes at 190°-200° F. Run A was processed without airflow; Run B was processed with an airflow of about 50 headspace changes per hour. The alkalized powder from each run was dried and subjected to color and pH analysis.

|     | Run A | Run B |
| --- | --- | --- |
| L   | 18.18 | 15.50 |
| a   | 9.07  | 7.07  |
| b   | 5.96  | 4.19  |
| a:b | 1.52  | 1.69  |
| pH  | 7.76  | 7.19  |

Visually, the cocoa powder of Run B possessed much deeper red coloration than the powder of Run A in both the dry and rehydrated form.

Having thus described the invention, what is claimed is:

1. A method for producing a colored, powdered-dutched cocoa comprising the steps of:
   (a) subdividing cocoa press cake to obtain particles which will pass through a No. 4 U.S. Standard Sieve;
   (b) adding the subdivided cocoa and an aqueous alkali solution to a reactor, said solution being present in an amount effective to provide an initial moisture content within the reactor of from 5 to 60% by weight and a level of alkali, selected from the group consisting of carbonate, bicarbonate, hydroxide and combinations thereof, of from 1 to 12% based upon the weight of cocoa;
   (c) mixing the contents of the reactor for between about 5 and 180 minutes while maintaining the reactor contents at a temperature between about 150° and 300° F. and at a pressure between about 10 and 200 p.s.i., said pressure being effected by means of an oxygen-containing gas;
   (d) venting the reactor and feeding oxygen-containing gas to the reactor during the reaction period in order to effect headspace changes in the reactor at the rate of at least 3 per hour; thereafter,
   (e) releasing the pressure within the reactor; and then,
   (f) drying the colored, dutched cocoa.

2. The method of claim 1 wherein a cocoa having a deep black color is produced, the alkali is a combination of a potassium carbonate and/or bicarbonate and an ammonium carbonate and/or bicarbonate, the reactor contents are maintained at 230° to 300° F., the reactor pressure is from 30 to 200 p.s.i. and the reaction time is from 60 to 180 minutes.

3. The method of claim 2 wherein the reactor contents are maintained at 250° to 275° F. and the reaction time is from 60 to 100 minutes.

4. The method of claim 2 wherein the reactor contents are maintained at a pressure of from 75 to 180 p.s.i.

5. The method of claim 1 wherein a cocoa having a deep red color is produced, the reactor contents are maintained at 150° to 220° F. and the reaction time is from 5 to 60 minutes.

6. The method of claim 1 wherein the oxygen-containing gas is a mixture of oxygen and nitrogen.

7. The method of claim 6 wherein the oxygen-containing gas is compressed air.

8. The method of claim 1 wherein at least 15 headspace charges per hour are made.

9. The method of claim 1 wherein the colored, dutched cocoa is dried by vacuum drying.

10. The method of claim 9 wherein the cocoa is vacuum dried in the reactor.

11. The method of claim 1 wherein the initial moisture content is greater than 35% and less than 60%.

12. The method of claim 1 wherein the initial moisture content is from 35 to 50%.

13. The method of claim 12 wherein the moisture content is maintained at between 35 and 45% throughout the reaction period.

14. The method of claim 13 wherein water is added to the reactor contents during the reaction period.

15. The method of claim 1 wherein the cocoa presscake is subdivided to pass through a No. 7 U.S. Standard Sieve.

16. The method of claim 1 wherein the aqueous alkali solution is heated before being combined with the subdivided cocoa.

17. The method of claim 1 wherein the subdivided cocoa is heated before being combined with the aqueous alkali solution.

18. The method of claim 1 wherein the reactor contents are continuously mixed throughout the reaction period.

19. The method of claim 1 wherein the aqueous alkali solution contains ammonium bicarbonate and is heated to between 120° and 140° F. before being combined with the subdivided cocoa.

20. The method of claim 1 wherein the reactor pressure is between 75 and 150 p.s.i.

21. The product Produced by the method of claim 5 which has a Hunter "L" value 15.5 or below and an "a":"b" value of more than 1.6.

22. The product produced by the method of claim 2 which has a Hunter "L" value less than 14.

* * * * *